US009954690B2

(12) United States Patent
Syrett et al.

(10) Patent No.: US 9,954,690 B2
(45) Date of Patent: Apr. 24, 2018

(54) TRANSFERRING A CONFERENCE SESSION BETWEEN CONFERENCE SERVERS DUE TO FAILURE

(75) Inventors: Mark Syrett, Lumbin (FR); Frederic Huve, Villard Bonnot (FR); Sanjeeva Manvi, Karnataka (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 700 days.

(21) Appl. No.: 14/110,277

(22) PCT Filed: Jul. 25, 2011

(86) PCT No.: PCT/US2011/045143
§ 371 (c)(1),
(2), (4) Date: Oct. 7, 2013

(87) PCT Pub. No.: WO2013/015777
PCT Pub. Date: Jan. 31, 2013

(65) Prior Publication Data
US 2014/0022889 A1   Jan. 23, 2014

(51) Int. Cl.
*H04J 1/16* (2006.01)
*H04L 12/18* (2006.01)
*H04M 3/56* (2006.01)
*H04L 29/06* (2006.01)
*H04L 29/14* (2006.01)

(52) U.S. Cl.
CPC ...... *H04L 12/1863* (2013.01); *H04L 12/1831* (2013.01); *H04L 65/1063* (2013.01); *H04L 65/403* (2013.01); *H04L 69/40* (2013.01); *H04M 3/56* (2013.01); *H04L 12/1818* (2013.01)

(58) Field of Classification Search
CPC ............ H04L 12/1863; H04L 12/1831; H04L 65/1063; H04L 65/403; H04L 69/40; H04L 12/1818; H04M 3/56
USPC ................................ 370/216, 217, 260, 261
See application file for complete search history.

(56) References Cited

U.S. PATENT DOCUMENTS

| 6,879,565 | B2 | 4/2005 | Baxley et al. |
| 7,480,827 | B2 | 1/2009 | Callaway et al. |
| 7,484,115 | B2 | 1/2009 | Zbu et al. |
| 7,916,855 | B2 * | 3/2011 | Caballero-McCann et al. ................ 379/221.04 |
| 2006/0153064 | A1 | 7/2006 | Caballero-McCann |

(Continued)

FOREIGN PATENT DOCUMENTS

CN   101166191   4/2008

(Continued)

OTHER PUBLICATIONS datatracker.ietf.org—Media Server Control (mediactrl) Description of Working Group, dated on or before May 24, 2011 (3 pages).

(Continued)

*Primary Examiner* — Peter Cheng
(74) *Attorney, Agent, or Firm* — Hewlett Packard Enterprise Patent Department

(57) ABSTRACT

Commands relating to a conference session being handled by a first conference server are logged, where the commands are exchanged between an application server and the first conference server. Failure of the first conference server is detected. In response to detecting the failure, the logged commands are used to transfer the conference session to a second conference server.

15 Claims, 5 Drawing Sheets

(56) References Cited

U.S. PATENT DOCUMENTS

| | | | |
|---|---|---|---|
| 2006/0179147 A1* | 8/2006 | Tran et al. | 709/227 |
| 2006/0271812 A1 | 11/2006 | Horton et al. | |
| 2007/0011191 A1* | 1/2007 | Otokawa | H04L 65/1063 |
| 2008/0077666 A1 | 3/2008 | Sekaran | |
| 2009/0119389 A1 | 5/2009 | Mu et al. | |
| 2009/0190736 A1 | 7/2009 | Bertin et al. | |
| 2011/0051726 A1 | 3/2011 | Bejerano et al. | |
| 2011/0122863 A1 | 5/2011 | Balasaygun et al. | |

OTHER PUBLICATIONS

Dyke et al., Network Working Group—Media Server Control Markup Language (MSCML) and Protocol—Nov. 2006 (76 pages).
Groves et al., Network Working Group—Gateway Control Protocol Version 1—Jun. 2003 (214 pages).
Ong et al., Network Working Group—An Introduction to the Stream Control Transmission Protocol (SCTP)—May 2002 (11 pages).
Saleem et al., Independent Submission—Media Server Markup Language (MSML)—Feb. 2010 (185 pages).
The International Searching Authority, The International Search Report and the Written Opinion, dated Feb. 17, 2012, 8 Pages.
www.dialogic.com—Driving a Media Server from Java, dated on or before May 24, 2011 (1 page).
European Patent Office, Extended European Search Report for EP11870090.5 dated Mar. 16, 2015 (7 pages).

\* cited by examiner

TRANSFERRING A CONFERENCE SESSION BETWEEN CONFERENCE SERVERS DUE TO FAILURE

CROSS-REFERENCE TO RELATED APPLICATION

This application is a national stage application under 35 U.S.C. § 371 of PCT/US2011/45143, filed Jul. 25, 2011.

BACKGROUND

Conference systems are provided to allow users to engage in audio/video conference sessions. With certain audio/video conference systems, audio/video conference sessions can be established over an Internet Protocol (IP) network, such as the Internet or other network. Media resources are included in the audio/video conference systems to process and/or control media exchanged during audio/video conference sessions.

BRIEF DESCRIPTION OF THE DRAWINGS

Some embodiments are described with respect to the following figures.

DETAILED DESCRIPTION

Figure 1:
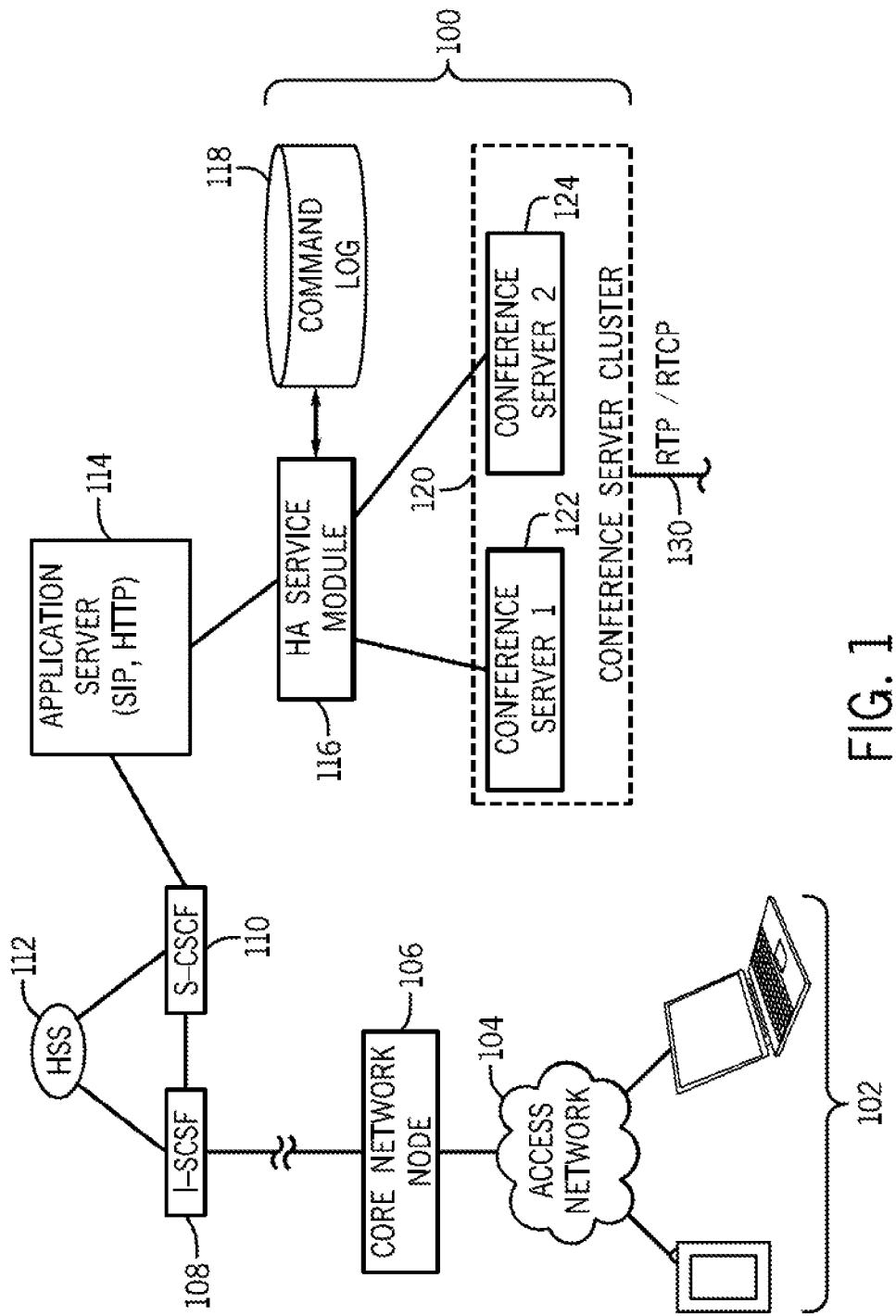
FIG. 1 is a block diagram of an example arrangement in which some implementations can be incorporated.

An audio/video conference system can include multiple conference servers for establishing and/or controlling audio/video conference sessions (sessions among two or more users in which audio and/or video data is exchanged). A conference server includes a media resource to provide various media-related services, such as establishment of a media path (for communicating audio/video data) between endpoints associated with users, performance of media manipulation such as voice or video stream mixing, playing of tones and announcements, and/or other media-related services. As used here, "audio/video data" refers to audio data or video data, or both.

Examples of conference servers include a media resource function (MRF) (which typically includes an MRF controller and an MRF processor), an interactive voice response (IVR) system, an Internet Protocol (IP) media server, a multipoint control unit (MCU), or other conference servers.

An MRF can provide media-related functions such as media manipulation and playing of tones and announcements. The MRF controller (MRFC) of the MRF is a signaling plane node that is involved in the exchange of control signaling for establishing conference sessions. The MRF processor (MRFP) is a media node used to process media streams—the MRFP is controlled by the MRFC.

An IVR system interacts with users through the use of voice and/or DTMF (dual-tone multi-frequency signaling) inputs. In response to an incoming call from a user, an IVR system can respond with prerecorded or dynamically generated audio prompts to direct the user regarding how to proceed further with a conference session. In response to the audio prompts, the user can enter voice and/or DTMF inputs.

An IP media server is a server for handling media traffic on an IP network. A multipoint control unit provides the capability for three or more endpoints to participate in a multipoint conference.

Although various example conference services are listed above, there can be other types of conference servers as well.

In some audio/video conference systems, fault tolerance may not be provided. Such audio/video conference systems employ non-redundant conference servers, such that failure of any of the conference servers may result in the loss of conference service to users.

To provide fault tolerance, redundant conference servers can be provided. A typical fault-tolerant solution in an audio/video conference system is to duplicate (at each of the redundant conference servers) individual voice packets and signaling traffic. Such duplication of individual voice packets and signaling traffic at redundant conference servers may involve use of dedicated resources in the redundant conference servers to provide fault tolerance. As a result, use of redundant conference servers in this manner can result in increased equipment costs, and reduced scalability (reduced ability to easily expand the capacity of the audio/video conference system). Moreover, such fault-tolerant solutions may involve customization of the redundant conference servers, which may prevent the use of commercial off-the-shelf (COTS) computer servers.

In accordance with some implementations, high-availability (continued service in the presence of faults or failures) is provided in an audio/video conference system that uses non-redundant conference servers. By employing non-redundant conference servers, the cost of the audio/video conference system is reduced, while still providing resilience in the event of failure of any conference server. A "non-redundant conference server" refers to a conference server that does not duplicate media (audio/video media) or control signaling of another conference server.

FIG. 1 illustrates an example conference server cluster 120 that has multiple non-redundant conference servers 122 and 124. Although just two conference servers are shown in the example of FIG. 1, it is noted that in alternative examples, the conference server cluster 120 can include more than two conference servers. In some implementations, the conference servers 122 and 124 are non-redundant conference servers.

To provide for high-availability while using non-redundant conference servers, a high-availability (HA) service module 116 is provided. The HA service module 116 along with the conference serves 122 and 124 are part of an audio/video conference system 100.

In the example of FIG. 1, the HA service module 116 is a function that is separate from an application server 114 and from the conference server cluster 120. As examples, the HA service module 116 can be deployed on a computing node that is separate from the computing node(s) implementing the application server 114 or the computing node(s) implementing the conference servers 122, 124. Alternatively, the HA service module 116 can be part of the same computing node as the application server 114 or the conference servers 122, 124.

In alternative implementations, as discussed further below in connection with FIG. 3, instead of deploying the HA service module 116 as a separate function, the HA service module can be implemented as a driver associated with the application server 114.

The HA service module 116 can be developed by the developer of the conference servers 122 and 124. In this manner, when deploying non-redundant conference servers in the conference server cluster 120, the developer of the audio/video conference system does not have to rely on a third party (such as the developer of the application server 114 shown in FIG. 1) to develop fault tolerant arrangements. By providing the HA service module 116, a high-availability mechanism is provided that is transparent to the application server 114 and to the conference servers 122, 124. Moreover, by implementing high availability with the HA service module 116, the developer of the application logic does not have to be concerned with modifying the application logic to support fault tolerance.

The application server 114 depicted in FIG. 1 is a computing node (or an arrangement of nodes) that hosts and executes predefined services. The application server 114 can include services that participate in establishing and controlling media sessions, such as the media sessions in audio/video conference sessions of the conference server cluster 120. In some implementations, the application server 114 is able to process SIP (Session Initiation Protocol) and HTTP (Hypertext Transfer Protocol) signaling relating to media sessions.

SIP is a signaling protocol defined by the Internet Engineering Task Force (IETF) and used for controlling multimedia communication sessions including voice and/or video sessions over an IP network. A current version of SIP is described in Request for Comments (RFC) 3261, entitled "SIP: Session Initiation Protocol," dated June 2002.

HTTP is a networking protocol that defines requests and responses for communications over a network between a requester and a responder (e.g., a client and a server). As examples, an HTTP request may be a request to obtain a web page at a server, while an HTTP response is a response that provides the web page.

Although reference has been made to specific control signaling protocols such as SIP and HTTP, note that in alternative implementations, other signaling protocols can be employed for the establishment of audio/video conference sessions. In the ensuing discussion, reference is made to a framework in which SIP and/or HTTP is employed—note, however, that in alternative implementations, similar techniques or mechanisms can be used for other types of control signaling protocols.

In implementations according to FIG. 1, the application server 114 interfaces with an S-CSCF (Serving Call Session Control Function) 110. The S-CSCF 110 in turn interacts with an I-CSCF (Interrogating CSCF) 108. The CSCFs are SIP servers or proxies that are used to process SIP signaling packets. The S-CSCF can handle tasks such as SIP registration, signaling message inspection, determination of which application server each SIP message should be forwarded to, and so forth.

The I-CSCF is responsible for forwarding a SIP message to an S-CSCF. The I-CSCF is also responsible for querying an HSS (home subscriber server), such as an HSS 112 shown in FIG. 1, to retrieve an address of a respective S-CSCF that is to be used for a particular session that is being established. The HSS 112 is a user database that contains subscription-related information, such as subscriber profiles, to allow for authentication and authorization of users, as well as to provide information regarding a user's location and IP information.

The I-CSCF 108, S-CSCF 110, HSS 112, and application server 114 can be considered to be part of a media services network, such as an IP multimedia subsystem (IMS) that is used for delivering IP multimedia services. The multimedia services network can include other nodes that are not shown in FIG. 1. Note that the media services network can also include other nodes (not shown) involved in exchanges of HTTP signaling.

In other examples, different arrangements of nodes involved in signaling for establishing IP-based sessions can be used.

To access services provided by the media services network, terminals (endpoints) 102 associated with users can connect through an access network 104 and core network node 106. Examples of the terminals 102 include computers (e.g. desktop computers, notebook computers, personal digital assistants, etc.).

The access network 104 can be a wireless access network, such as that provided by a cellular system or other type of wireless system (e.g. WiFi). Alternatively, the access network 104 can also be a wired access network. The core network node 106 performs packet routing and transfer, mobility management, and other functions.

To establish an audio/video conference session, a terminal 102 sends control signaling, such as SIP signaling, through the access network 104 and core network node 106 to the media services network that includes the I-CSCF 108, S-CSCF 110, HSS 112, and application server 114. The SIP signaling is routed to the application server 114, which in turn routes control messages to the conference server cluster 120 for establishing various aspects of the audio/video conference session. The control messages can include conference create messages (for creating an audio/video conference session), conference entry requests (requests by users to join a conference session already in progress, conference control messages (for providing control commands to selected conference server(s)), and/or other control messages.

The control messages can be according to various formats defined by media server protocols, such as MSCML (Media Server Control Markup Language) (which is a protocol used in conjunction with SIP to deliver multimedia conferencing services over IP networks); MSCML (Media Server Markup Language) (which is a protocol used to control and invoke different types of services on IP media servers); H.248 (which is a protocol for controlling media gateways); a protocol developed by the media server control (mediactrl) group of IETF; or any other protocol. Such control messages can be carried over SIP, IP, TCP (Transmission Control Protocol), and SCTP (Stream Control Transmission Protocol), as examples.

In accordance with some implementations, the HA service module 116 is configured to log the control messages exchanged between the application server 114 and the conference server cluster 120. The logged control messages are stored in a command log 118. The command log 118 can be stored on non-persistent storage media.

In some implementations, the HA service module 116 is implemented as a SIP network server that is provided in the signaling path(s) between the application server 114 and the conference server cluster 120. The control messages from the application server 114 are routed by the HA service module 116 to the appropriate one of the conference servers 122, 124.

Once an audio/video conference session is established with a conference server (or multiple conference servers), a media path 130 is established between the conference server(s) and the corresponding terminals 102 that are involved in the established audio/video conference session. The media paths 130 are used for exchanging audio/video media with the terminals.

In some examples, a media path is established according to a Real-Time Transport Protocol (RTP), which defines a standardized packet format for delivering audio and/or video data over an IP network. RTP is used in conjunction with the RTP Control Protocol (RTCP). While RTP carries media streams, RTCP is used to monitor transmission statistics and quality of service, and aids in synchronization of multiple streams.

In other examples, other protocols that define formats of audio/video media can be used.

Figure 2:
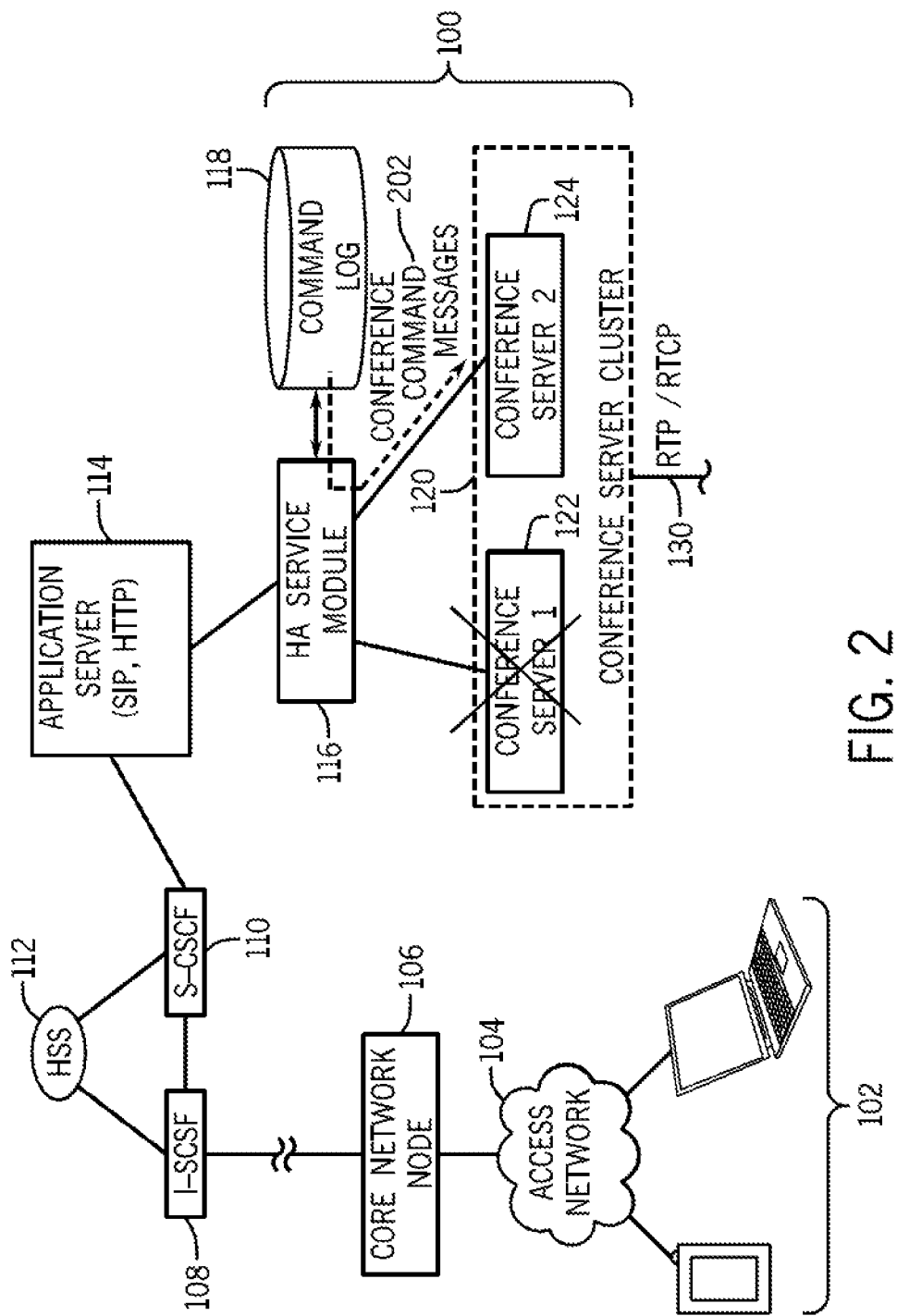
FIG. 2 is a block diagram of the example arrangement of FIG. 1 after failure of a media resource.

FIG. 2 shows an example in which failure of the conference server 122 has occurred. The HA service module 116 is able to detect such failure of the conference server 122. The failure detection mechanism can employ use of heartbeats between the HA service module 116 and each of the conference servers 122, 124. On an intermittent basis (e.g. periodic basis), each conference server sends a heartbeat message to the HA service module 116. If the HA service module 116 detects that it has not received a heartbeat message from a particular conference server within some predefined time interval, then the HA service module 116 would identify the particular conference server as a failed conference server. In some examples, in response to lack of receipt of a heartbeat message from the particular conference server, the HA service module 116 may attempt to contact the particular conference server—an inability to reach such particular conference server would result in the HA service module 116 indicating that the particular conference server has failed.

Upon detection of failure of the conference server 122, the HA service module 116 identifies another conference server (e.g., 124 in FIG. 2) that can serve as a backup to the failed conference server 122. In implementations where there are more than two conference servers, the HA service module 116 can use some predefined criterion to select from among multiple conference servers to use as the backup conference server. An example criterion can be a load-balancing criterion, where the conference server used is the least loaded conference server. Other criteria can be used in other implementations, such as a criterion based on proximity of a conference server to the terminals involved in the audio/video conference session, a criterion relating to relative costs of using the multiple conference servers, and so forth.

Once the backup conference server has been identified, the HA service module 116 retrieves conference control messages from the command log 118, where the retrieved conference control messages are related to the audio/video conference session that was served by the failed conference server 122. In scenarios where the conference server 122 was supporting multiple audio/video conference sessions, the HA service module 116 would attempt to re-locate (transfer) each of the multiple audio/video conference sessions to respective backup conference server(s).

The retrieved conference control messages (from the command log 118) are replayed to the identified backup conference server, which in the example of FIG. 2 is the conference server 124. The conference control messages 202 are replayed at the backup conference server 124, which effectively transfers the audio/video conference session to the backup conference server 124. "Transferring" a audio/video conference session from a first conference server to the backup conference server refers to transferring the media path(s) of the audio/video conference session such that the audio/video data is communicated between the terminals and the backup conference server, and transferring state information of the audio/video conference session (e.g. users that are involved in the session, users who have joined or dropped out after the session was established, etc.).

Figure 3:
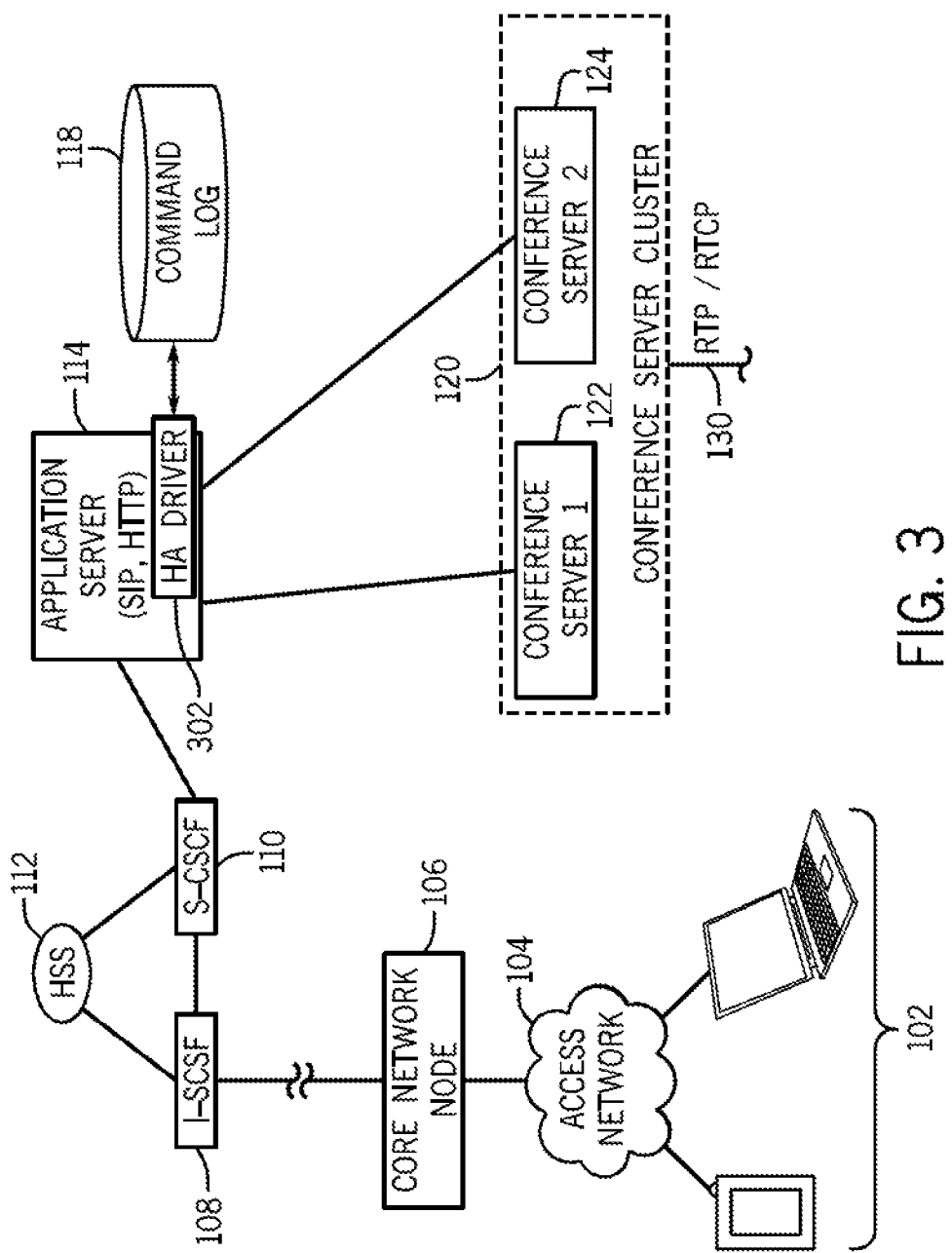
FIG. 3 is a block diagram of another example arrangement in which alternative implementations can be incorporated.

In different implementations, as shown in FIG. 3, functionality of the HA service module 116 (of FIGS. 1 and 2) is provided in a driver module 302 of the application server 114. The HA driver module 302 is designed to interact with application logic running on the application server 114. The HA driver module 302 has an interface, such as an application programming interface (API) that can be used by the application logic of the application server 114 to interact with the HA driver module 302. In some examples, the HA driver module 302 is a JSR (Java Specification Request) 309 driver. JSR 309 defines a standard interface for media server control, including manipulation of audio/video streams and conferences.

The HA driver module 302 is able to use a heartbeat mechanism to detect failure of any of the conference servers 122, 124. In addition, the HA driver module 302 performs tasks similar to those of the HA service module 116, including logging of conference control messages in the command log 118, identifying a backup conference server in response to failure of a particular conference server, and replaying of conference control messages to re-locate an audio/video conference session to the backup conference server.

The remaining components of FIG. 3 are similar to those depicted in FIG. 1, and thus are not described further.

Figure 4:
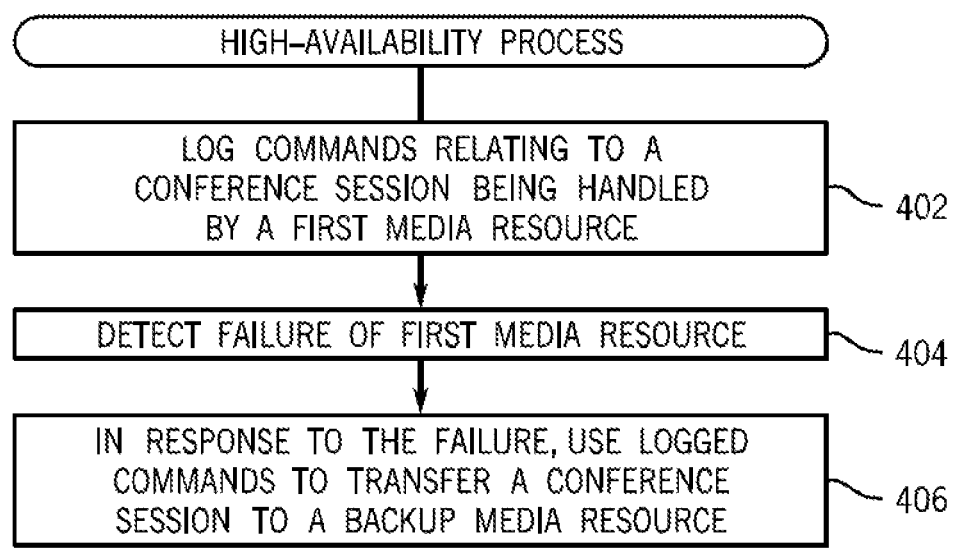
FIG. 4 is a flow diagram of a process performed according to some implementations.

FIG. 4 is a flow diagram of a process according to some implementations, which can be performed by the HA service module 116 of FIG. 1 or HA driver 302 of FIG. 3. The process logs (at 402) commands relating to an audio/video conference session that is being handled by a first media resource (such as a first conference server). The logged commands are exchanged between the application server 114 (FIG. 1 or 3) and the first media resource.

The process next detects (at 404) failure of the first media resource (such as failure of the conference server 122 shown in FIG. 2). In response to detecting the failure, the process uses (at 406) logged commands corresponding to an audio/video conference session being handled by the failed media resource to transfer the conference session to a backup media resource.

Using techniques or mechanisms according to some implementations, high availability can be provided while using cheaper non-redundant conference servers. Also, scalability of the audio/video conference system is enhanced since off-the-shelf conference servers can be employed that are not designed for fault tolerance. Additionally, application logic of an application server for establishing/controlling conference sessions does not have to be modified to support high availability.

Figure 5:
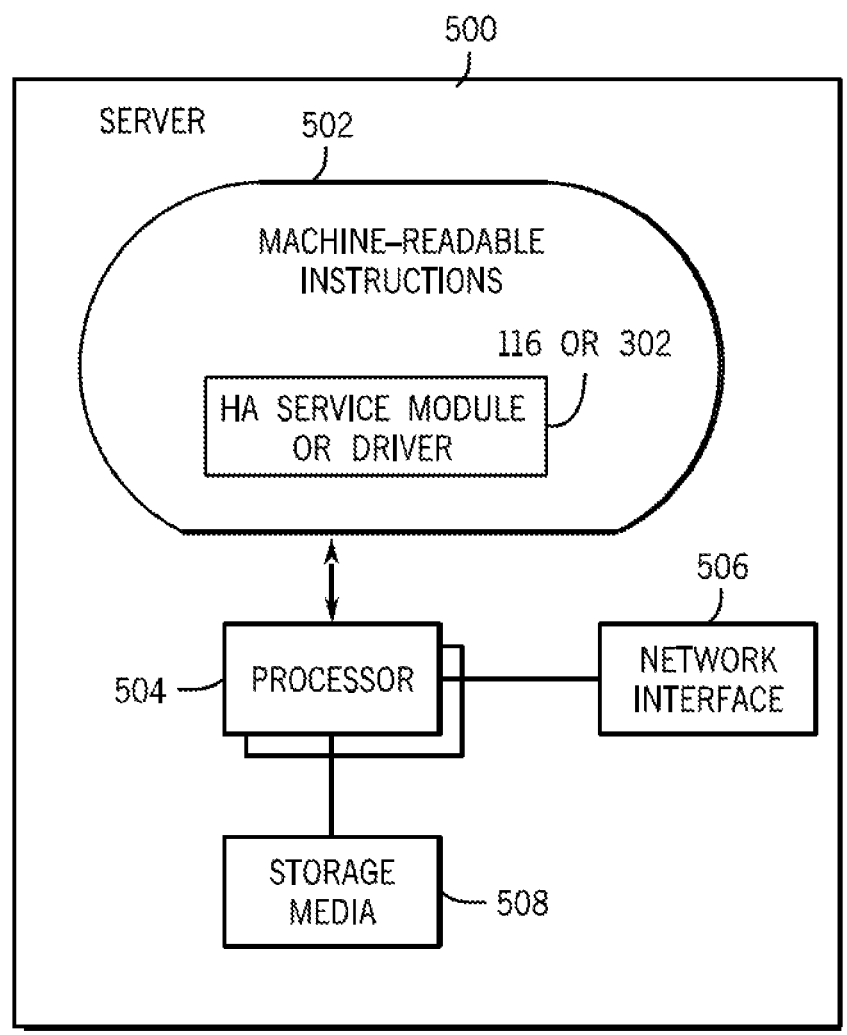
FIG. 5 is a block diagram of an example system capable of incorporating some implementations.

FIG. 5 illustrates an example system 500, which can be a node to run an availability service such as the HA service module 116 of FIG. 1 or the HA driver 302 of FIG. 3. The system 500 includes machine-readable instructions 502 (e.g. HA service module 116 or HA driver 302) that are executable on one or multiple processors 504. A processor can include a microprocessor, microcontroller, processor module or subsystem, programmable integrated circuit, programmable gate array, or another control or computing device.

The processor(s) 504 is (are) connected to a network interface 506 and storage media 508. The network interface 506 allows the system 500 to communicate over a data network, whereas the storage media 508 can store data and machine-readable instructions.

The storage media 508 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    logging, by an availability service executing in a system having a processor, commands relating to a conference session being handled by a first conference server, wherein the commands are exchanged between an application server and the first conference server, wherein logging the commands comprises logging a command to create the conference session and logging a command for a user to join the conference session;
    detecting, by the availability service, failure of the first conference server; and
    in response to detecting the failure, the availability service using the logged commands to transfer the conference session to a second conference server.

2. The method of claim 1, wherein the transfer of the conference session from the first conference server to the second conference server is accomplished without having to duplicate media packets or signaling traffic at the first and second conference servers prior to the transfer.

3. The method of claim 1, wherein the first and second conference servers are non-redundant conference servers.

4. The method of claim 1, wherein detecting the failure of the first conference server is based on using a heartbeat technique between the availability service and the first conference server.

5. The method of claim 1, wherein logging the commands exchanged between the application server and the first conference server comprises logging the commands sent by the application server that is configured to process Session Initiation Protocol (SIP) messages.

6. The method of claim 1, wherein logging the commands relating to the conference session comprises logging the commands relating to an audio/video conference session.

7. The method of claim 1, wherein using the logged commands to transfer the conference session to the second conference server comprises causing replaying of the logged commands at the second conference server.

8. The method of claim 1, wherein the availability service is separate from the application server and a cluster of conference servers including the first conference server.

9. The method of claim 1, wherein the availability service is a driver of the application server.

10. The method of claim 1, wherein the availability service comprises machine-readable instructions executing in the system having the processor.

11. A system comprising:
    a network interface; and
    at least one processor to:
        log commands relating to a conference session that is handled by a first conference server, wherein the first conference server is to establish at least one media path with terminals that are to be involved in the conference session, and wherein the commands are exchanged between an application server and the first conference server, wherein the logged commands include a command to create the conference session and a command to join a user into the conference session;
        detect failure of the first conference server; and
        in response to detecting the failure, retrieve the logged commands and cause replay of the logged commands at a second conference server to cause transfer of the conference session to the second conference server.

12. The system of claim 11, wherein the at least one processor is to further:
    identify the second conference server from among plural conference servers to use as the conference server for transfer of the conference session.

13. The system of claim 11, further comprising a module to cause the at least one processor to perform the logging, detecting, retrieving, and replaying, wherein the module is separate from the application server and a cluster of conference servers.

14. An article comprising at least one non-transitory machine-readable storage medium storing the instructions that upon execution cause a system to:
    log, by an availability service comprising machine-readable instructions executed by a processor in the system, commands relating to a conference session being handled by a first conference server, wherein the commands are exchanged between an application server and the first conference server, and wherein logging the commands comprises logging a command to create the conference session and logging a command for a user to join the conference session;
    detect, by the availability service, failure of the first conference server; and
    in response to detecting the failure, use, by the availability service, the logged commands to transfer the conference session to a second conference server.

15. The article of claim 14, wherein the detecting of the failure of the first conference server is based on using a heartbeat message between the availability service and the first conference server.

\* \* \* \* \*